United States Patent
Herrli et al.

(10) Patent No.: US 10,679,380 B2
(45) Date of Patent: Jun. 9, 2020

(54) METHOD FOR CALIBRATION OF A STEREO CAMERA

(71) Applicant: XOVIS AG, Zollikofen (CH)

(72) Inventors: Markus Herrli, Allmendingen (CH); Adrian Pauli, Burgdorf (CH)

(73) Assignee: XOVIS AG, Zollikofen (CH)

( * ) Notice: Subject to any disclaimer, the term of this patent is extended or adjusted under 35 U.S.C. 154(b) by 37 days.

(21) Appl. No.: 15/750,618

(22) PCT Filed: Jun. 1, 2016

(86) PCT No.: PCT/EP2016/062407
§ 371 (c)(1),
(2) Date: Feb. 6, 2018

(87) PCT Pub. No.: WO2017/025214
PCT Pub. Date: Feb. 16, 2017

(65) Prior Publication Data
US 2019/0019309 A1    Jan. 17, 2019

(30) Foreign Application Priority Data
Aug. 7, 2015  (EP) ..................................... 15405052

(51) Int. Cl.
*G06T 7/00*     (2017.01)
*G06T 7/80*     (2017.01)
(Continued)

(52) U.S. Cl.
CPC ............ *G06T 7/85* (2017.01); *G06K 9/00523* (2013.01); *G06K 9/6203* (2013.01);
(Continued)

(58) Field of Classification Search
CPC ........................................................ G06T 7/85
(Continued)

(56) References Cited

U.S. PATENT DOCUMENTS 7,557,835 B2 *  7/2009  Douret ................. H04N 13/296
                                                348/222.1
9,036,898 B1 *  5/2015  Beeler ..................... G06T 19/20
                                                382/154
(Continued)

FOREIGN PATENT DOCUMENTS

EP    2 902 267 A1    8/2015
GB    2 440 826 A     2/2008
JP    2013-113600 A   6/2013

*Primary Examiner* — Jeffery A Williams
(74) *Attorney, Agent, or Firm* — Birch, Stewart, Kolasch & Birch, LLP

(57) ABSTRACT

In a method for calibration of a stereo camera (1) comprising two cameras (2, 3) arranged in a distance along a first direction (x) and mechanically attached to a common structure, rectification functions mapping raw image coordinates to rectified coordinates are provided. Recalibration is based on images of a scene captured by the stereo camera (1) affixed in an observation position, the recalibration yielding correction functions mapping rectified coordinates to corrected coordinates. Recalibration is based on matching objects comprised in images of the captured scene obtained by the two cameras (2, 3). The stereo camera (1) is affixed in a fixed relationship with a planar surface (4), with a known distance and angle between the stereo camera (1) and the surface (4), and objects are matched in the recalibration that belong to the surface (4), wherein a disparity caused by the known distance is exploited when determining the correction functions. Exploiting the additional information with respect to the surface (4), the determination of the correction functions may be greatly improved. In particular, the inventive method allows for employing general correction functions, and no modelling of the calibration errors is required.

15 Claims, 2 Drawing Sheets

(51) Int. Cl.
*H04N 13/246* (2018.01)
*G06K 9/00* (2006.01)
*G06K 9/62* (2006.01)

(52) U.S. Cl.
CPC . *H04N 13/246* (2018.05); *G06T 2207/10012* (2013.01); *G06T 2207/30242* (2013.01)

(58) Field of Classification Search
USPC ......................................................... 348/159
See application file for complete search history.

(56) References Cited

U.S. PATENT DOCUMENTS

| | | |
|---|---|---|
| 2004/0125207 A1 | 7/2004 | Mittal et al. |
| 2005/0237385 A1* | 10/2005 | Kosaka .................. G01B 11/00 348/42 |
| 2012/0050488 A1 | 3/2012 | Cohen et al. |
| 2015/0022669 A1* | 1/2015 | Hall ...................... H04N 17/002 348/187 |
| 2015/0206217 A1* | 7/2015 | Cohen .................... G06Q 30/00 705/26.5 |

* cited by examiner

METHOD FOR CALIBRATION OF A STEREO CAMERA

TECHNICAL FIELD

The invention relates to a method for calibration of a stereo camera comprising two cameras arranged in a distance along a first direction and mechanically attached to a common structure.

BACKGROUND ART

Stereo cameras, i. e. camera devices including at least two cameras arranged in a certain mutual distance, in order to obtain three-dimensional image information, have a wide field of application. One field of use relates to the monitoring of scenes, where stereo cameras provide additional information, namely about the three-dimensional position and/or extension of captured objects. Usually, the corresponding stereo cameras are attached to a building structure such as a ceiling or wall, in a fixed position and orientation that allows for monitoring the respective scene. Three dimensional capturing of scenes is particularly useful in the field of people counting, where the additional information allows for higher precision, especially when monitoring complex or extended scenes with many objects.

In order to obtain reliable results, the stereo cameras need to be calibrated. After calibration, the stereo camera (including the electronics for the processing of image data obtained by the at least two cameras) will yield at least two rectified images, i. e. images where distortion effects due to the used lenses and further optical elements are compensated, and where the coordinates of the images obtained by the cameras correspond to each other with the exception of a disparity along the first direction caused by the corresponding distance between the location of the cameras.

Usually, the stereo cameras are calibrated in the manufacturing process (factory calibration). This is usually done by employing precisely measured and positioned targets (often checkerboard patterns). However, due to transport, thermal effects, aging etc. calibration errors may be caused that impair the quality of the stereo images or of results obtained from analysis of the stereo images. In particular, lost calibration may lead to an impaired quality of the dense stereo image due to mismatches of the stereo algorithm and to defective reprojection into the three-dimensional space, which leads inter alia to erroneous distance measurements.

In order to reestablish the desired accuracy, the device needs to be calibrated anew. With known devices, this usually means that they will need to be sent back to the factory where the required equipment for performing the recalibration is available. This is expensive and cumbersome. Furthermore, doing so is not viable with respect to devices that are in continuous use, in particular safety relevant devices.

US 2015/022669 A1 (Microsoft) relates to real-time registration of a camera array in an image capture device. To do so, a selected, relatively small subset of independent parameters in a mapping function is adjusted. This allows for performing the re-calibration with a reduced number of matching patterns, i. e. based on images that are captured during normal camera array usage, without the need for specialized calibration targets.

The feasibility of this method depends on whether it is possible to identify the small subset of independent parameters that a) allows for field recalibration in the described manner and b) allows for the correction of all the calibration errors that are to be expected after factory calibration. In connection with certain stereo cameras and the calibration errors to be expected, the conditions a) and b) may not be simultaneously fulfilled, making this method unfeasible.

JP 2013-113600 (Sharp Corp.) discloses another approach. It relates to a method for recorrecting the calibration of a stereo camera. The calibration corrects distortions and inclinations of the images. A calibration error is determined by identifying matching spots of the images (preprocessed using the present calibration parameters). Based on the identified calibration error, offset values for compensating the error are generated.

However, in the context of typical scenes captured by stereo cameras, e. g. in the field of object or people counting, these offsets are not sufficently comprehensive and precise to reliably allow for correcting all possible calibration errors. This is especially true in connection with lenses exhibiting substantial distortion and having a large field-of-view (FOV).

SUMMARY OF THE INVENTION

It is the object of the invention to create a method for calibration of a stereo camera pertaining to the technical field initially mentioned, that allows for reliable correction of calibration errors, in particular in connection with lenses of substantial distortion and/or large field-of-view (FOV).

The solution of the invention is specified by the features of claim 1. According to the invention, the method comprises the steps of:
a) providing rectification functions mapping raw image coordinates to rectified coordinates;
b) recalibration based on images of a scene captured by the stereo camera affixed in an observation position, the recalibration yielding correction functions mapping rectified coordinates to corrected coordinates;
where
c) recalibration is based on matching objects comprised in images of the captured scene obtained by the two cameras;
where
d) the stereo camera is affixed in a fixed relationship with a planar surface, with a known distance and angle between the stereo camera and the surface, and in that
e) in the recalibration objects are matched that belong to the surface, wherein a disparity caused by the known distance is exploited when determining the correction functions.

It is to be noted that throughout this description the term "mapping" is used for assigning coordinates from a second coordinate system to coordinates from a first coordinate system, where usually this assignment may be both ways unless otherwise stated. As an example, the correction functions mapping rectified coordinates to corrected coordinates may be functions that provide a coordinate in the second coordinate system (corrected coordinates) when given a coordinate in the first coordinate system (rectified coordinates) or functions that provide a coordinate in the first coordinate system (rectified coordinates) when given a coordinate in the second coordinate system (corrected coordinates). It depends on the details of the application whether the first or the second function is needed. Often, it will be possible to invert the mapping function (analytically and/or numerically), if required.

Preferably, the rectification functions are obtained by factory calibration of the stereo camera, based on images of test targets obtained by the two cameras. Alternatively, default rectification functions are used, based on the lens type used in the respective stereo camera.

Preferably, the correction functions are independent from the rectification functions, and the rectification functions and the correction functions are consecutively applied to the coordinates to be mapped (in a suitable order and using the inverse, if required). Alternatively, the correction functions are constituted by the rectification functions or a subset thereof. This means, that determining the correction functions amounts to readjust the rectification functions, in particular certain parameters defining the rectification functions.

Usually, the cameras and their image sensors are arranged such and the obtained image data is rectified in such a way that a (wanted) disparity will only occur along a single direction (say x direction). In a perfectly calibrated stereo system the pixels relating to the same spot in the real world lie on the same y coordinate whereas the x coordinate is shifted by exactly the disparity d, where $$d = \frac{f * B}{z},$$

where B denotes the baseline, i. e. the distance between the two camera objectives, f denotes the focal length of the two objectives and z denotes the distance to the imaged object normal to the image plane.

Accordingly, the disparity due to the distance from the surface and therefore from the matched objects belonging to the surface will only be exploited for certain of the correction functions.

An object is considered to belong to a surface if it comprises visible (and trackable) features that essentially lie in the plane defined by the surface. In the case of the surface being a floor, such objects comprise e. g. features of a floor covering, floor markings or similar.

Exploiting the additional information with respect to the surface, the determination of the correction functions may be greatly improved. In particular, the inventive method allows for employing general correction functions, and no modelling of the calibration errors is required.

It is to be noted that the inventive method is applicable in situations where the stereo camera is parallel to the planar surface, i. e. where the optical axes of the two cameras are perpendicular to the surface, as well as in situations where the stereo camera is mounted in an inclined orientation. As described in more detail below, the angle may be easily taken into account during recalibration.

The inventive method is especially advantageous with stereo cameras having a field of view of at least 90°×80° (horizontal×vertical). This is where recalibration is particularly useful and where alternative approaches known from the prior art fail.

Similarly, the inventive method is especially advantageous with stereo cameras having a lens distortion in the used lens area of at least 1%, in particular of at least 2%. This allows for using less expensive lenses, greatly reducing the cost of the hardware. The used lens area is that area of the lens that is passed by light rays originating from the monitored scene and impinging on the active sensor area.

Advantageously, a first correction function for obtaining a corrected coordinate along the first direction and a second correction function for obtaining a corrected coordinate along a second direction perpendicular to the first direction both depend from a first coordinate along the first direction and a second coordinate along the second direction. This allows for correcting more complicated calibration errors than prior art methods aiming at separately correcting the first coordinate and the second coordinate, the respective functions depending either on the first or the second coordinate. This is especially true in applications where the correction functions are independent from the rectification functions, i. e. where the rectification functions obtained from the factory calibration or the default rectification functions are untouched by the recalibration.

This feature may be of advantage even in methods where the disparity caused by the distance to a planar surface is not taken into account, i. e. in the context of a method comprising steps a)-c) above and not necessarily steps d), e).

Preferably, the correction functions are parametrized by a number of parameters. The values of these parameters are determined in the recalibration process. In a preferred embodiment, the first correction function and the second correction function are second order polynomials of the first and the second coordinate. It has turned out that such functions are well suited for the inventive purpose. Furthermore, they may be easily inverted. Most preferably, the correction functions are true second order polynomials, i. e. polynomials where the second order coefficients have non-zero values. Nevertheless, second order polynomials include also first order polynomials, i. e. linear functions. They may be sufficient in some cases. In general, the achievable precision with linear functions will be lowered, but the fitting will be more robust.

Other parametrizations are possible, e. g. combinations of sine and cosine functions or similar.

Preferably, the recalibration is based on rectified coordinates. This means that rectification (using the parameters obtained from factory calibration or definining the default rectification functions) is applied to the raw coordinates before the recalibration is performed. Rectification will compensate for the main image errors and thus greatly simplify the recalibration. It is to be noted that technically this feature may be implemented in different ways; rectification may be applied to the obtained images, or the rectification functions (or their inverse) is included into the correction functions for the determination of these functions (or their coefficients, respectively).

In a preferred embodiment, the planar surface is a floor surface and the observation position is above the floor surface. It has turned out that the inventive method is particularly well suited for such applications, in particular if the stereo camera is rigidly fixed to the ceiling (or another mechanically stable mounting point in the ceiling region), having a fixed position and orientation with respect to the floor. One important field of application of stereo cameras mounted in this way is people counters as they are used e. g. in airports, train stations, retail environments (such as shops, malls) or the like.

In particular, the distance between the stereo camera and the surface amounts to at least 2.20 m.

Other applications are possible. As an example, the planar surface may be a wall or ceiling surface, and the observation position is chosen such that the wall or ceiling or a region thereof is captured by the at least two cameras of the stereo camera.

In a preferred embodiment, an angle between the stereo camera and the surface is measured by a sensor device integrated to the stereo camera. As an example, when the planar surface is a floor or wall surface of a room or building, it is assumed that this surface is (almost perfectly) horizontal or (almost perfectly) vertical as this is the orientation that was to be achieved when the building was erected. The sensor device measures the orientation of the device with respect to the earth. Under the aforementioned assumption with respect to the orientation of the floor or wall surface, the relative orientation, including one or several angles, may be easily determined from the orientation measured by the sensor device. Subsequently, this measured angle or angles are taken into account when the correction functions are determined and/or applied.

Instead of a sensor device, the angle may be manually entered into the stereo camera or a downstream circuit for processing the image data. Finally, the stereo camera may be affixed to the respective carrier (e. g. ceiling or wall) in such a way that it precisely has a predetermined orientation (e. g. horizontal or vertical). This last option is feasible if the changes to the orientation, effected after the mounting of the stereo camera, by the influences as mentioned above, are considered to be negligible. In principle, in the context of the inventive method it is not required that the angle is known to a high precision. Residual errors may be absorbed by the correction functions.

Advantageously, the objects comprised in images of the captured scene are matched by a feature extraction algorithm. Corresponding algorithms are known per se. An example of a suitable algorithm is the Kanade-Lucas-Tomasi (KLT) feature tracker. It is fast and uses comparably little computational resources. When using such an algorithm, it is usually required that there is a good initial guess about displacement between the features to be matched in the two images. However, in the case of a stereo camera mounted in a fixed relationship with a planar surface the disparity of objects belonging to that surface may be calculated using the known distance (and angle). Due to the fact that a considerable portion of the features that are usually found by the feature extraction algorithm will belong to the planar surface, this calculated disparity may be used for the initial guess.

It is to be noted that the matching of objects not belonging to the surface may be reduced if required. As an example, a certain area of the captured images may be defined to relate to the surface, and the matching will only be performed in this area. Similarly, certain areas of the captured images may be excluded. Nevertheless, in most cases these additional steps may be avoided if a robust recalibration algorithm is used.

Other algorithms for matching objects in the images are possible, such as a scale-invariant feature transform (SIFT) algorithm as known from the stitching of images.

Preferably, the matching of the objects comprised in images of the captured scene is done with subpixel precision. This improves the results of the subsequent determination of the correction functions. Despite the fact that the analyzed images only have a certain resolution, corresponding to the distance of neighboring pixels, subpixel precision may be obtained if extended features are matched and/or a certain number of matched objects are taken into account.

Advantageously, the correction functions are obtained by regression analysis, optimizing an agreement between coordinates of the matched objects in an image obtained by a first of the two cameras with coordinates of the matched objects obtained from applying the correction functions to the coordinates of the matched objects in an image obtained by a second of the two cameras. The regression analysis may be based on a least squares method. Due to the fact that mismatches are possible, a method should be used that is robust with respect to outliers. This also ensures that the final result will be correct even if some of the matched features do not belong to the planar surface.

In a preferred embodiment, the coordinates of the matched objects in the image obtained by the first camera are shifted by the expected disparity due to the known distance. In particular, the target values in the regression analysis will be correspondingly adjusted.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

PREFERRED EMBODIMENTS

Figure 1:
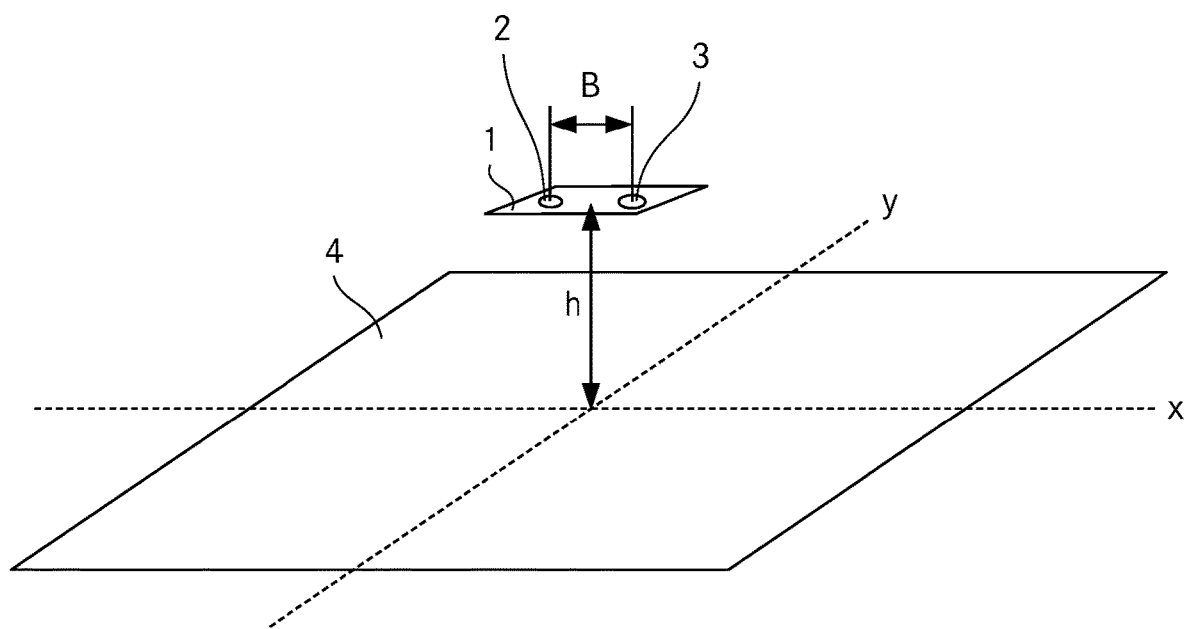
FIG. 1 A schematic representation of the general setup, and
FIG. 2 a block diagram of the inventive method.

The following description relates to a stereo camera that is used for people counting applications. The general setup is schematically depicted in FIG. 1. The stereo camera 1 includes two cameras 2, 3 that are affixed to a common frame and accommodated in a housing. The distance between the optical axes of the two cameras 2, 3 along the axis x is denoted by B. The y coordinate of both cameras 2, 3 is the same. The cameras 2, 3 allow for a large field of view of 124°×94°, however the optics exhibits large distortions of more than 0.5% in the used lens area that need to be compensated during image processing. During production, the cameras 2, 3 including all optical elements and the sensors are rigidly attached to the frame, inter alia using a suitable adhesive. In use, the housing of the stereo camera is rigidly attached to a surface, e. g. a ceiling, and a substantially static scene is monitored. In the described example, the stereo camera 1 is arranged at a height h over a planar horizontal floor 4.

At the end of the manufacturing process, the stereo camera 1 is factory calibrated. In order to obtain reliable calibration throughout the lifetime of the device, factory calibration is combined with the application of correction functions, wherein the correction functions may be updated if required. The corresponding method is described in the following. It is visualized in the block diagram of FIG. 2.

Factory calibration is achieved by means known as such in the field of stereo imaging (step 11). In particular, prior to shipping and mounting the stereo camera (e. g. in a final stage of the manufacturing process of the device), precisely defined test images are brought in a defined position with respect to the stereo camera, and corresponding rectification functions (i. e. parameters defining such functions) are determined and stored in the device. Corresponding approaches are known e. g. from R. I. Hartley, "Theory and practice of projective rectification", Int. Journal of Computer Vision 35(2), 115-127 (1999); R. Y. Tsai, "A versatile camera calibration technique for high accuracy 3D machine vision metrology using off-the-shelf TV cameras and lenses", IEEE Journal of Robotics and Automation, Vol. 3, Iss. 4, 323-344, 1987; Z. Zhang, "A flexible new technique for camera calibration", IEEE Transactions on Pattern Analysis and Machine Intelligence, 22(11):1330-1334, 2000.

These rectification functions are always applied to the raw pixel data, before applying the correction functions. In general, the rectification functions will stay constant throughout the lifetime of the device, whereas the correction functions may be redetermined. This is justified due to the fact that the cameras and sensors are reliably fixed to a common mechanical carrier. Mechanical as well as optical properties of the components will only slightly change over time (e. g. due thermal effects, aging, transport etc.). Accordingly, these slight changes may be corrected by adapting the correction functions, without the need for complete (factory) recalibration.

Figure 2:
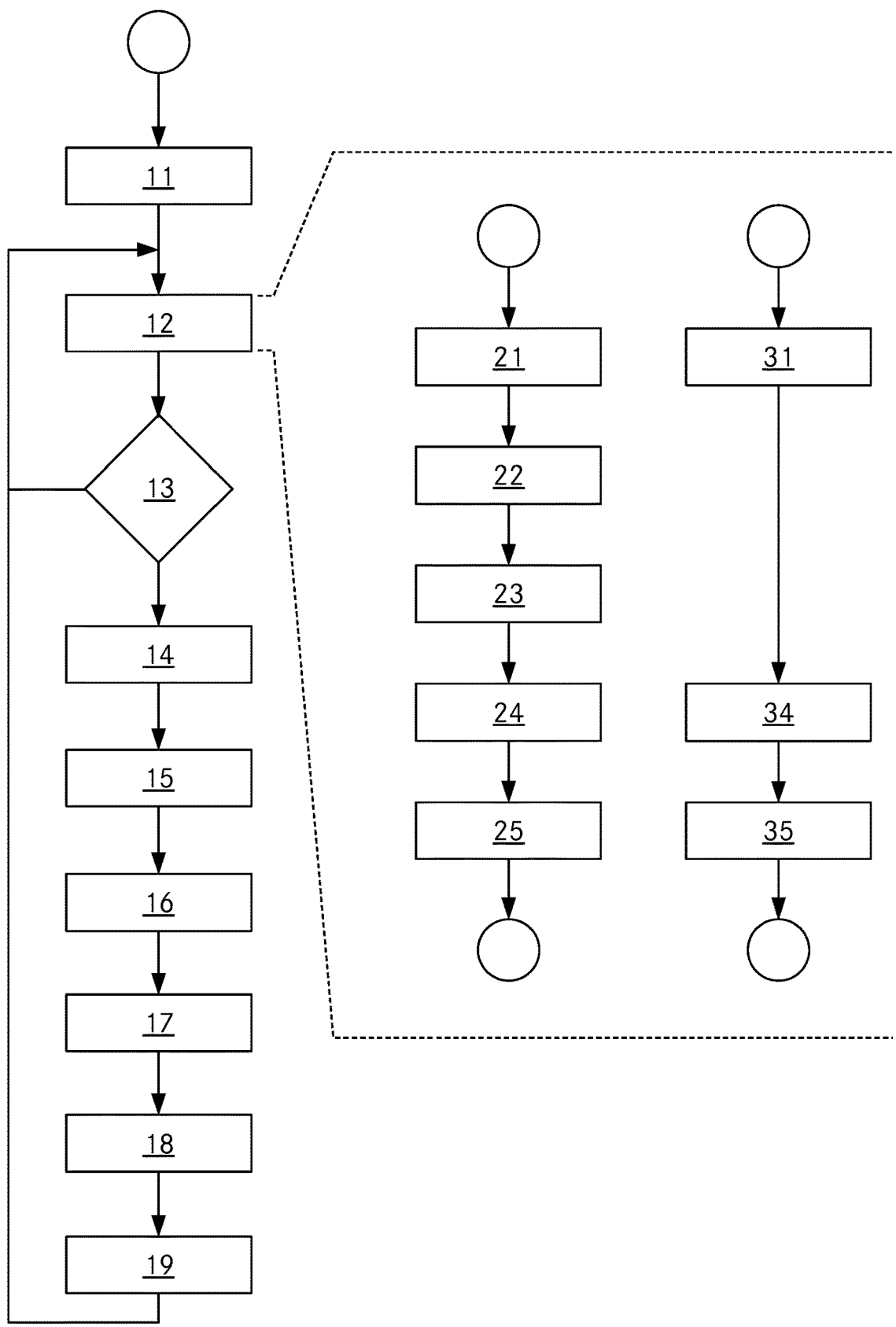

The normal operation (monitoring) mode of the device is represented in FIG. 2 by step 12. Recalibration is carried out when a certain criterion 13 is fulfilled. The criterion may be strictly time-based (e. g. recalibration each day or week at a predetermined time), or it may be based on measurements obtained by the stereo camera that are indicative for calibration errors or it may be triggered manually.

In the described example, two correction functions $F_x$, $F_y$ are determined. They will be applied exclusively to the right image, the left image always stays with factory calibration only. Both functions $F_x$, $F_y$ are continuous functions $\mathbb{R}^2 \to \mathbb{R}$. In the given example, a second order polynomial is used, other functions (such as linear polynomials) are also applicable.

The calculation of the correction functions is based on the two images obtained by the two cameras 2, 3 of the stereo camera 1 obtained from the scene monitored by the stereo camera (step 14). There are regions that are covered by both images. In the context of stereo cameras mounted in an overhead configuration, most of the imaged regions will overlap and a substantial part of the images will show the floor and features belonging to the floor. The floor is assumed to be a (perfectly) planar surface. It is to be noted that the images will not contain additional test targets but only the usual elements visible in the scene at the time of recalibration.

In a first step, corresponding features in both images will have to be identified. This yields pairs of sets of pixel coordinates that designate the same location in reality. In a perfectly calibrated stereo system, each feature of a feature pair lies on the exact same y coordinate in its image, whereas the x coordinates are shifted by the disparity d. The disparity d may be expressed as follows:

$$d = \frac{f * B}{z},$$

where B denotes the baseline, i. e. the distance between the two camera objectives, f denotes the focal length of the two objectives and z denotes the distance to the imaged object normal to the image plane. In the present example, where objects belonging to the floor shall be matched and where the camera plane is assumed to be parallel to the floor, z=h.

For the identification of corresponding features, different approaches are available. In the disclosed embodiment, marked features are "tracked" from one image to the others. This may be done by a Kanade-Lucas-Tomasi (KLT) feature tracker, known as such. The feature is searched for in the left image and subsequently tracked in the right picture. In order to obtain reliable results, the displacement between the features should be small or the initial guess should be quite good. In the described embodiment, in connection with features belonging to the floor, these conditions are fulfilled because the stereo camera is mounted in a position having an approximately known distance from the floor, which allows to guess the position of the tracked features by essentially applying the disparity as discussed before.

Apart from feature tracking, other methods are applicable such as some known from the stitching of images. An example is the Scale-invariant feature transform (SIFT) algorithm.

In general, the application of the matching process allows for obtaining results at subpixel precision. It is to be noted that the matching algorithms may lead to mis-assignments, accordingly, the further processing of the results is based on error-tolerant, robust algorithms.

The matching (step 15) will yield N feature pairs with their respective coordinates in the left image $(x_{iL}, y_{iL})$ and in the right image $(x_{iR}, y_{iR})$, where i=1, . . . n.

A correction function $F_y$ along the y direction is now determined (step 16) that corrects all features on the right image, with a minimal total error. For that purpose, the function $F_y$ is parameterized as a second order polynomial:

$$F_y(x_{iR}, y_{iR,uncorr}) = \beta_0 + \beta_1 x_{iR} + \beta_2 y_{iR,uncorr} + \beta_3 x_{iR}^2 + \beta_4 y_{iR,uncorr}^2 + \beta_5 x_{iR} y_{iR,uncorr},$$

where $x_{iR}$ denotes the x coordinate of feature i in the right image and $y_{iR,uncorr}$ denotes the (uncorrected) y coordinate of feature i in the right image.

This may be expressed in vector notation:

$$F_y(x_{iR}, y_{iR,uncorr}) = \vec{\beta} \cdot \vec{x}_i.$$

For each feature pair of index i, the fit error $\in_i$ will be $$F_y(x_{iR}, y_{iR,uncorr}) + y_{iR,uncorr} = y_{iL} + \in_i \to \in_i = F_y(x_{iR}, y_{iR,uncorr}) + y_{iR,uncorr} - y_{iL}.$$

Accordingly, the target value $b_i$ of the correction function is defined as follows:

$$b_i = y_{iL} - y_{iR,uncorr}.$$

The parameter set $\vec{\beta}$ may now be found by minimizing the following function:

$$\mathrm{argmin}_\beta \Sigma_{i=1}^N |b_i - \vec{\beta} \cdot \vec{x}_i|^p,$$

where p denotes the indicator of the norm, which leads to ordinary least squares for p=2 and which is robust for p<2.

For the subsequent application to generate a rectification map, the function needs to be inverted (step 17):

$$y_{iR,corr} \approx y_{iL} = y_{iR,uncorr} + F_y(x_{iR}, y_{iR,uncorr}), \text{ where } x_{iR} \text{ does not change for the } y \text{ correction};$$

$$y_{iR,corr} = y_{iR,uncorr} + \beta_0 + \beta_1 x_{iR} + \beta_2 y_{iR,uncorr} + \beta_3 x_{iR}^2 + \beta_4 y_{iR,uncorr}^2 + \beta_5 x_{iR} y_{iR,uncorr}$$

is a quadratic function in $y_{iR,uncorr}$ and may thus be easily inverted.

In a next step, the correction function $F_x$ along the x direction is determined (step 18). This is done in an analogous way, the only difference being the expected disparity due to the known distance to the floor is supplemented in the term for the target value:

$$b_i = x_{iL} - x_{iR} - d_0.$$

The distance to the floor is determined and stored during installation of the device. It may be input by a technician or measured by a suitable measuring device integrated into the stereo camera. Usually, a precision of ±5 cm is sufficient with respect to the distance to the floor. The camera plane is assumed to be parallel to the floor, i. e. the angle between the optical axes of the two cameras and the floor is assumed to be 90°.

It is to be noted that in cases where the floor is not (exactly) parallel to the sensor surface this will lead to a disparity $d_0$ that is not constant but dependent from x and y. However, this may be easily absorbed by $b_i$. Accordingly, it is not imperative to precisely measure inclination, corresponding errors will be absorbed by the correction functions.

With respect to the correction function $F_x$ along the x direction and unlike the function $F_y$ along the y direction, only features lying in the floor plane will substantially contribute to the fitting, due to the additional term in the target value and the robust fitting algorithm.

Again, the resulting quadratic function may be easily inverted for subsequent application in generating the rectification map (step 19).

After application of the described optimization method, the correction functions $F_y(x_R, y_R), F_x(x_R, y_R)$ as well as their inversions are available to be used in the normal operating mode of the device (step 12).

In order to convert a coordinate of the right corrected and rectified image to a coordinate of the right raw image, the following steps are applied:
1. The pixel coordinates are converted to homogenous coordinates. This eliminates the dependence from the resolution of the rectified image. All further calculations are based on homogenous coordinates (step 21).
2. The inverted correction function $F_x$ is applied (step 22).
3. The inverted correction function $F_y$ is applied (step 23).
4. The rectification functions $x_{raw}=F_{rectx}(x_{rect}, y_{rect})$ and $y_{raw}=F_{recty}(x_{rect}, y_{rect})$, transforming the coordinates from a virtual perfectly oriented image sensor to the real image sensor, are applied (step 24). In this step, distortions due to the employed optics are not yet taken into account.
5. Finally, the coordinates are converted from perfect (pinhole) optics to the distorted real sensor optics (step 25).

Correction is not applied to the left image. This means that with respect to the left image only the steps 1, 4 and 5 are applied (steps 31, 34, 35 in FIG. 2).

The invention is not restricted to the described embodiment. As an example, the described embodiment relates to a device comprising two cameras. Nevertheless, the inventive method may be easily generalized to devices comprising more than two cameras.

In the described method, the two correction functions for the x and y coordinate are separately parametrized and determined. In alternative embodiments, the determination of the two functions may be simultaneous, or even a unitary function for the mapping of both coordinates is employed.

As a matter of course, the method may be applied in such a way that the left instead of the right image is corrected or even in such a way that the total required correction is distributed to both images.

In summary, it is to be noted that the invention provides for a method for calibration of a stereo camera that allows for reliable correction of calibration errors, in particular in connection with lenses of substantial distortion and/or large field-of-view (FOV).

The invention claimed is:
1. A method for calibration of a stereo camera comprising two cameras arranged in a distance along a first direction and mechanically attached to a common structure, the method comprising the steps of:
   a) providing rectification functions mapping raw image coordinates to rectified coordinates;
   b) recalibration based on images of a scene captured by the stereo camera affixed in an observation position, the recalibration yielding correction functions mapping rectified coordinates to corrected coordinates;

where
   c) recalibration is based on matching objects comprised in images of the captured scene obtained by the two cameras;
wherein
   d) the stereo camera is affixed in a fixed relationship with a planar surface, with a known distance and angle between the stereo camera and the surface,
   e) the objects comprised in images of the captured scene are matched by a feature extraction algorithm; and in that
   f) in the recalibration objects are matched that belong to the surface, wherein a disparity caused by the known distance is exploited when determining the correction functions by calculating the disparity from the known distance and angle and by using the disparity for an initial guess for the feature extraction algorithm about a displacement between the objects to be matched in the images of the captured scene obtained by the two cameras.

2. The method as recited in claim 1, wherein a first correction function for obtaining a corrected coordinate along the first direction and a second correction function for obtaining a corrected coordinate along a second direction perpendicular to the first direction both depend from a first coordinate along the first direction and a second coordinate along the second direction.

3. The method as recited in claim 2, wherein the first correction function and the second correction function are second order polynomials of the first and the second coordinate.

4. The method as recited in claim 1, wherein the recalibration is based on rectified coordinates.

5. The method as recited in claim 1, wherein a field of view of the stereo camera is at least 90°×80°.

6. The method as recited in claim 1, wherein a lens distortion in a used lens area is at least 1%.

7. The method as recited in claim 1, wherein the planar surface is a floor surface and in that the observation position is above the floor surface.

8. The method as recited in claim 7, wherein the distance between the stereo camera and the surface amounts to at least 2.20 m.

9. The method as recited in claim 1, wherein an angle between the stereo camera and the surface is measured by a sensor device integrated to the stereo camera.

10. The method as recited in claim 1, wherein the objects comprised in images of the captured scene are matched by a feature extraction algorithm.

11. The method as recited in claim 1, wherein matching of the objects comprised in images of the captured scene is done with subpixel precision.

12. The method as recited in claim 1, wherein the correction functions are obtained by regression analysis, optimizing an agreement between coordinates of the matched objects in an image obtained by a first of the two cameras with coordinates of the matched objects obtained from applying the correction functions to the coordinates of the matched objects in an image obtained by a second of the two cameras.

13. The method as recited in claim 12, wherein the coordinates of the matched objects in the image obtained by the first camera are shifted by an expected disparity due to the known distance.

14. A method for calibration of a stereo camera comprising two cameras arranged in a distance along a first direction and mechanically attached to a common structure, the method comprising the steps of:

a) providing rectification functions mapping raw image coordinates to rectified coordinates;
b) recalibration based on images of a scene captured by the stereo camera affixed in an observation position, the recalibration yielding correction functions mapping rectified coordinates to corrected coordinates;

where c) recalibration is based on matching objects comprised in images of the captured scene obtained by the two cameras;

wherein d) the stereo camera is affixed in a fixed relationship with a planar surface, with a known distance and angle between the stereo camera and the surface,
e) the correction functions are obtained by regression analysis, optimizing an agreement between coordinates of the matched objects in an image obtained by a first of the two cameras with coordinates of the matched objects obtained from applying the correction functions to the coordinates of the matched objects in an image obtained by a second of the two cameras;
e) in the recalibration objects are matched that belong to the surface, wherein a disparity caused by the known distance is exploited when determining the correction functions by shifting the coordinates of the matched objects in the image obtained by the first camera by an expected disparity due to the known distance and angle.

15. The method as recited in claim 14, wherein target values in the regression analysis are adjusted corresponding to the coordinate shift.

\* \* \* \* \*